(12) United States Patent
Ceccarelli et al.

(10) Patent No.: US 11,368,406 B2
(45) Date of Patent: Jun. 21, 2022

(54) METHODS AND APPARATUS FOR PATH COMPUTATION IN A TELECOMMUNICATIONS NETWORK

(71) Applicant: Telefonaktiebolaget LM Ericsson (publ), Stockholm (SE)

(72) Inventors: Daniele Ceccarelli, Sollentuna (SE); Gianmarco Bruno, Genoa (IT); Francesco Lazzeri, Genoa (IT); Jeroen Nijhof, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 93 days.

(21) Appl. No.: 16/613,407

(22) PCT Filed: May 19, 2017

(86) PCT No.: PCT/EP2017/062138
§ 371 (c)(1),
(2) Date: Nov. 13, 2019

(87) PCT Pub. No.: WO2018/210433
PCT Pub. Date: Nov. 22, 2018

(65) Prior Publication Data
US 2020/0084158 A1 Mar. 12, 2020

(51) Int. Cl.
*H04L 47/726* (2022.01)
*H04L 45/24* (2022.01)
(Continued)

(52) U.S. Cl.
CPC ............ *H04L 47/726* (2013.01); *H04L 45/24* (2013.01); *H04L 47/125* (2013.01); *H04W 24/02* (2013.01)

(58) Field of Classification Search
CPC ..... H04L 47/726; H04L 45/24; H04L 47/125; H04W 24/02
See application file for complete search history.

(56) References Cited

U.S. PATENT DOCUMENTS 10,148,564 B2 * 12/2018 Wood ................... H04L 45/60
10,298,488 B1 * 5/2019 Wood ................... H04L 45/28
(Continued)

FOREIGN PATENT DOCUMENTS

| WO | 2015055230 A1 | 4/2015 |
| WO | 2016124228 A1 | 8/2016 |
| WO | 2017063667 A1 | 4/2017 |

OTHER PUBLICATIONS

PCT International Search Report, dated Feb. 1, 2018, in connection with International Application No. PCT/EP2017/062138, all pages.
(Continued)

*Primary Examiner* — Donald L Mills
(74) *Attorney, Agent, or Firm* — Leffler Intellectual Property Law, PLLC

(57) ABSTRACT

Apparatus and methods are provided for path computation for a service in a telecommunications network. In one aspect, a method comprises receiving a request to schedule the service utilizing the network in a time period determining that a path for the service is not available for the whole of the time period, and determining a plurality of paths for the service, each of the plurality of paths being available during a respective portion of the time period, such that at least one of the plurality of paths is available for the service at any time during the time period.

18 Claims, 4 Drawing Sheets

(51) Int. Cl.
  *H04L 47/125*   (2022.01)
  *H04W 24/02*   (2009.01)

(56) References Cited

U.S. PATENT DOCUMENTS

| | | | |
|---|---|---|---|
| 2016/0380889 A1 | 12/2016 | Chen et al. | |
| 2017/0070426 A1 | 3/2017 | Chen et al. | |
| 2017/0289028 A1* | 10/2017 | Ratnasingham | H04L 45/50 |
| 2018/0062875 A1* | 3/2018 | Tumuluru | H04L 12/4641 |
| 2018/0131570 A1* | 5/2018 | Lee | H04L 12/4633 |
| 2019/0356586 A1* | 11/2019 | Chen | H04L 45/50 |

OTHER PUBLICATIONS

PCT Written Opinion, dated Feb. 1, 2018, in connection with International Application No. PCT/EP2017/062138, all pages.
N. Ciulli et al., "Generalised Architecture for Dynamic Infrastructure Services", Geysers, Deliverable D4.1 GMPLS+/PCE+ Control Plane Architecture, Version 1.0, Nov. 30, 2010, 186 pages.
Y. Zhuang et al., "PCEP Extensions for LSP scheduling with stateful PCE"; PCE Working Group, Dec. 2016, 16 pages.
E. Crabbe et al., "PCEP Extensions for Stateful PCE"; PCE Working Group, Dec. 2016, 52 pages.
Daniele Ceccarelli et al., "Framework for Abstraction and Control of Traffic Engineered Networks", TEAS Working Group, Internet Draft, Dec. 22, 2016, 32 pages.
Y. Zhuang et al., "Architecture for Scheduled Use of Resources", TEAS Working Group, Nov. 30, 2016, 15 pages.
A. Farrel et al., "A Path Computation Element (PCE)-Based Architecture", Network Working Group, Aug. 2006, 40 pages.
JP. Vasseur et al., "Path Computation Element (PCE) Communication Protocol (PCEP)", Network Working Group, Mar. 2009, 87 pages.

* cited by examiner

METHODS AND APPARATUS FOR PATH COMPUTATION IN A TELECOMMUNICATIONS NETWORK

TECHNICAL FIELD

Examples of the present disclosure relate to methods, apparatus and computer-readable media for path computation for a service in a telecommunications network.

BACKGROUND

In computer and telecommunication networks, the responsibility for finding a suitable path in the network between a source node and a destination node may be assigned to a Path Computation Element (PCE). The path that is found may be subject to one or more constraints for the path itself and/or the network as a whole (e.g. to optimize one or more performance parameters).

One application of the PCE is in the Abstraction and Control of Traffic-Engineered Networks (ACTN) networking paradigm, conceived to facilitate virtual network operation and the creation of a virtualized environment in which operators can view and control multi-subnet and multi-technology networks as a single virtualized network.

Traffic engineering is a process by which the performance of a network, such as a telecommunications network, is evaluated and optimized. Traffic-oriented performance parameters may include one or more of packet delay, packet delay variation, packet loss and throughput. Traffic engineering may seek to optimize one or more of these parameters (either locally or globally), and one of the functions by which such optimization may be achieved is the routing function, to steer traffic through the network in the most effective way. Thus PCEs play an important role in the efficient utilization of resources in traffic-engineered networks.

A recent improvement to traffic-engineered networking is the introduction of time scheduling to reserve connectivity resources at future times. By this mechanism, users can reserve future resources for a service corresponding to a path between a source node and a destination node for a future period of time. However, if a path cannot be provided for the service between the source node and the destination node for the period of time, for example due to required resources being reserved for other services during the period of time, the user is informed that a path is not available.

SUMMARY

One aspect of the disclosure provides a method for path computation for a service in a telecommunications network. The method comprising receiving a request to schedule the service utilizing the network in a time period, determining that a path for the service is not available for the whole of the time period, and determining a plurality of paths for the service, each of the plurality of paths being available during a respective portion of the time period, such that at least one of the plurality of paths is available for the service at any time during the time period.

A further aspect provides a computer program comprising instructions which, when executed on at least one processor, cause the at least one processor to carry out the above method.

Another aspect provides an apparatus for path computation for a service in a telecommunications network. The apparatus comprises a processor and a memory. The memory containing instructions executable by the processor such that the apparatus is operable to receive a request to schedule the service utilizing the network in a time period, determine that a path for the service is not available for the whole of the time period, and determine a plurality of paths for the service, each of the plurality of paths being available during a respective portion of the time period, such that at least one of the plurality of paths is available for the service at any time during the time period.

A still further aspect provides an apparatus for path computation for a service in a telecommunications network. The apparatus comprises a receiving module configured to receive a request to schedule the service utilizing the network in a time period. The apparatus also comprises a path computation module configured to determine that a path for the service is not available for the whole of the time period, and determine a plurality of paths for the service, each of the plurality of paths being available during a respective portion of the time period, such that at least one of the plurality of paths is available for the service at any time during the time period.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
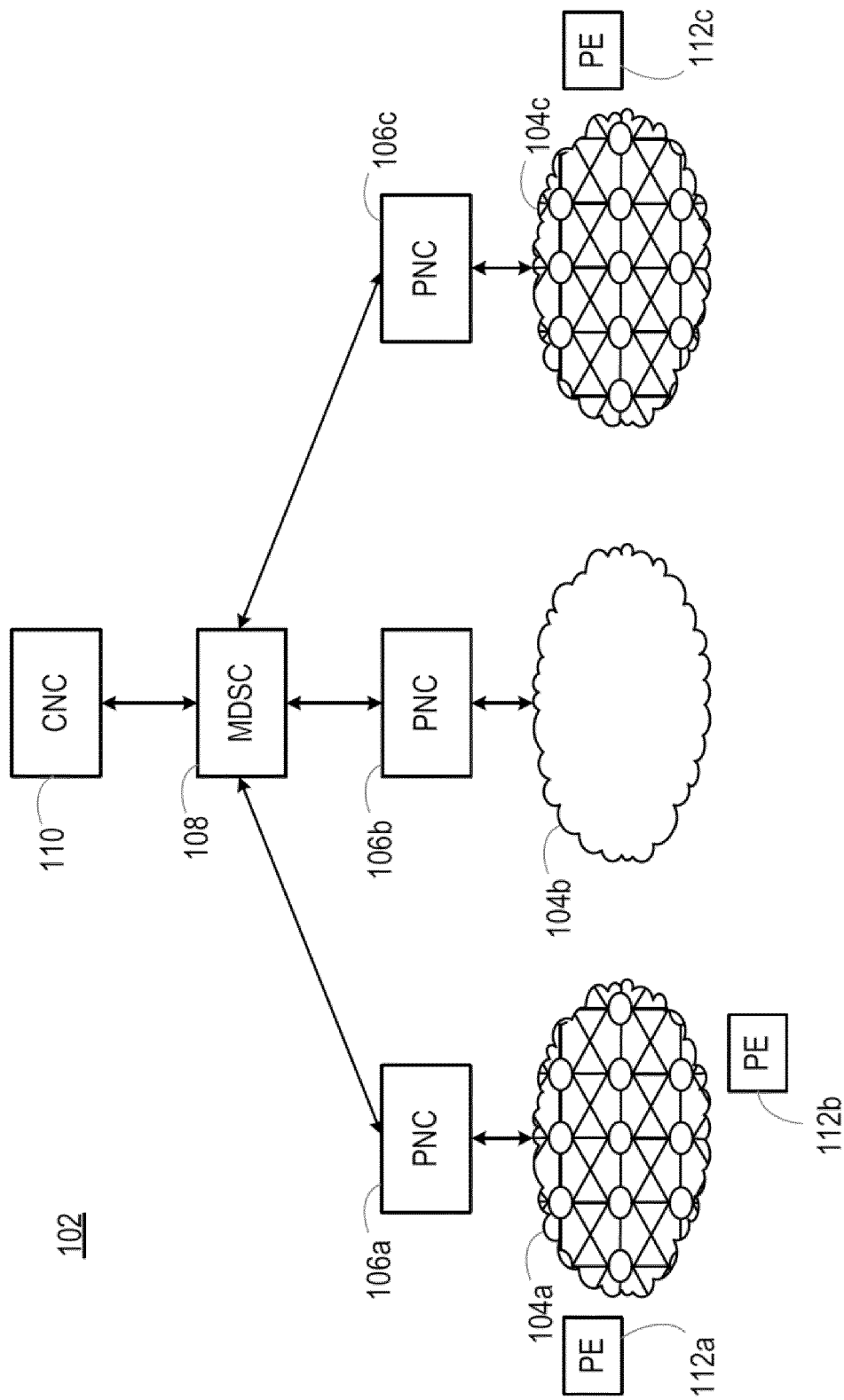
FIG. 1 is a schematic illustration of an example of a network.

FIG. 1 shows an example of a telecommunications network 102, and particularly the components concerned with control of the network 102. In the illustrated example, the components are arranged according to the ACTN paradigm, and ACTN terminology is used throughout the description of FIG. 1 and in other parts of the description. Those skilled in the art will appreciate that the concepts methods and apparatus described herein are equally applicable to other networking paradigms, and may be adapted straightforwardly for use in those networking paradigms. Embodiments disclosed herein are not limited to ACTN.

The example network 102 comprises a plurality of domains 104a, 104b, 104c (collectively, 104), each managed by respective physical network controllers (PNCs) 106a, 106b, 106c (collectively, 106). The PNCs each communicate with a parent controller, which in the illustrated embodiment is termed a multi-domain service coordinator (MDSC) 108, and the MDSC 108 communicates with one or more clients via one or more customer network controllers (CNCs) 110 (although only a single CNC is shown in FIG. 1). First and second network nodes or path elements (PEs) 112a, 112b are coupled to domain 104a, while a third network node or PE 112c is coupled to domain 104c.

Each PNC 106 is responsible for the configuration of network elements within its respective domain 104, monitoring the physical topology of the respective domain 104, and communicating that topology to the MDSC 108. The physical topology may be communicated to the MDSC in raw (i.e. unprocessed) or abstracted (i.e. processed) formats. The PNCs 106 communicate with their respective domains 104 via respective southbound interfaces (SBIs), and with the MDSC 108 via respective MDSC-PNC interfaces (MPIs). In some embodiments, the messages communicated via the MPIs may be defined and transported according to the Path Computation Element Protocol (PCEP). In other embodiments, the messages may be defined according to YANG (Yet Another Next Generation) and transported via the NETCONF network configuration protocol. In other embodiments, different data modelling systems and/or communication protocols may be employed.

Each PNC 106 may also comprise a path computation element (PCE) responsible for the computation of paths between network nodes or path elements (PEs) in their domain, i.e. intra-domain paths. For example, PNC 106a may be responsible for computing a path between PE 112a and PE 112b.

The MDSC 108 receives topological information from each of the PNCs 106, and thus is able to build a single end-to-end network topology covering the entire network 102. The end-to-end network topology may be abstracted (i.e. processed) so as to provide a consistent overview of the network regardless of different technologies and protocols implemented in each of the domains 104. The MDSC 108 may communicate that harmonized view of the network to one or more CNCs via respective CNC-MDSC interfaces (CMIs). In some embodiments, the messages communicated via the CMIs may be defined and transported according to PCEP. In other embodiments, the messages may be defined according to YANG and transported via the NETCONF network configuration protocol. In other embodiments, different protocols may be employed. The MDSC 108 may also receive requests from the CNCs 110 via the CMIs for the creation of new connections, the modification of existing connections or scheduled connections, or the removal of existing or scheduled connections.

The MDSC 108 thus enables management of the network 102 as a whole, allowing the maintenance of end-to-end services across multiple domains, the definition of virtual networks or slices across multiple domains, and additional services. The MDSC 108 may therefore comprise a PCE responsible for the computation of paths between network nodes or PEs in different domains, i.e. inter-domain paths. For example, the MDSC 108 may compute a path between PE 112a or PE 112b, and PE 112c.

Instances of PCEs can therefore be found in the PNCs as well as the MDSC. Embodiments of the disclosure therefore relate to PNCs, MDSCs, any network element or node in which a path computation element may be found. Embodiments of the disclosure also relate to any network element or node in which path computation is performed. Some embodiments of the disclosure may relate to path computation in a traffic-engineered network.

Embodiments of the disclosure relate to a scenario whereby a service between network nodes (e.g. path elements, PEs) is requested for a future period of time, but a single path between the nodes is unavailable for the whole of the period requested. This may be for example because some network resources, such as routing or switching elements or communication paths between routing or switching elements, are unavailable for at least part of the time period in at least one domain that the path will traverse. Alternatively, any paths that exist may not meet requirements for the service, such as for example latency, throughput, path cost, number of hops and/or any other suitable requirements.

In some embodiments, for example, a request may be received to schedule a service utilizing the network in a time period. The request may be received by for example a Path Computation Element (PCE). It is determined that a path for the service is not available for the whole of the time period. Subsequently, a plurality of paths for the service may be determined, each of the plurality of paths being available during a respective portion of the time period, such that at least one of the plurality of paths is available for the service at any time during the time period. In other words, for example, multiple paths may be found such that the requested service can be available for the whole of the time period, by using multiple paths for the service during different portions of the time period.

In some embodiments, multiple network nodes may contribute to determining one or more paths between nodes in the network 102. For example, the CNC 110 may send a request to schedule a service between PE 112a and PE 112c. The request may be received by MDSC 108. PE 112a may be connected to first domain 104a, and PE 112c may be connected to third domain 104c. The MDSC 108 may send separate instructions to PNCs 106a and 106c to determine a path through their respective domains. For example, the PNC 106a may be instructed to compute a path between PE 112a and an exit node from domain 104a. Similarly, the PNC 106c may be instructed to compute a path between an entry node to domain 104c and PE 112c. If a path is determined that also includes other domains, such as domain 104b for example, then appropriate network nodes may also be instructed to compute parts of a path. For example, MDSC 108 may instruct PNC 106b to compute a path between entry and exit nodes in the domain 104b. However, in other embodiments, the MDSC or some other network node may calculate one or more paths for the whole of the network 102.

Figure 2:
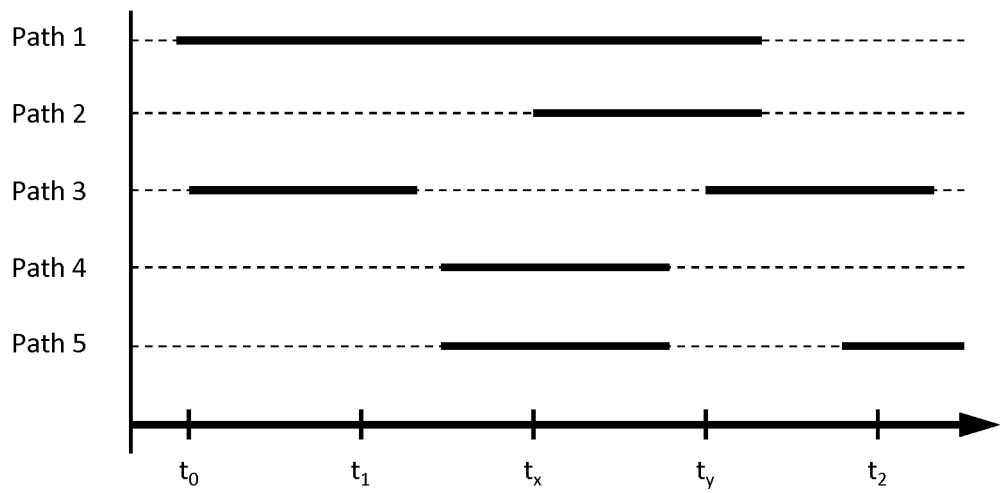
FIG. 2 is a timeline illustrating availability of paths between network nodes.

FIG. 2 shows an example of a timeline of availability of paths for a service in an example telecommunications network. In this example, five paths exist for the service, identified as Path 1 to Path 5. A thin dashed line indicates that a particular path is available at that time, whereas a thick solid line indicates that the particular path is unavailable, for example due to at least part of the path being reserved for some other service. For example, Path 1 is unavailable between time $t_0$ and after time $t_y$, Path 2 is unavailable between time $t_x$ and after time $t_y$, and so on.

In an example, a request to compute a path for a service may be received, the service being required between times $t_1$ and $t_2$. As can be seen from FIG. 2, no single path is available for the whole of the time period between $t_1$ and $t_2$ because each of the paths 1-5 is unavailable for at least a portion of the time period.

According to some embodiments of the disclosure, a plurality of paths for the service may be determined, each of the plurality of paths being available during a respective portion of the time period, such that at least one of the plurality of paths is available for the service at any time during the time period. This ensures that the service is available for the whole of the time period, wherein there are no interruptions, or any interruptions comprise an insignificant part of the time period.

Figure 3:
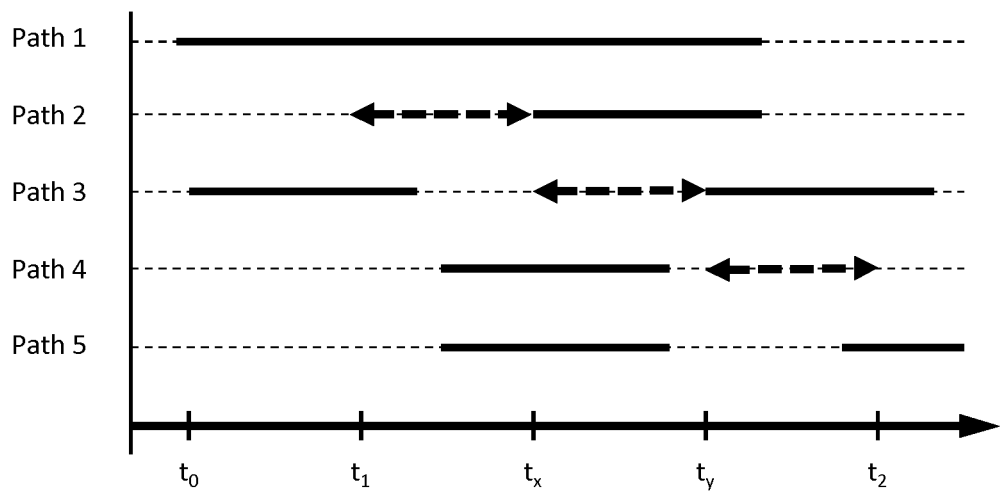
FIG. 3 is a timeline illustrating availability of paths between network nodes and a plurality of paths between the nodes that is determined.

FIG. 3 shows an example of a plurality of paths that may be determined for the service for the time period. The paths and availability are the same as those shown in FIG. 2. In FIG. 3, thick dashed arrows represent one example of a plurality of paths that may be determined for the service during the time period. As shown, Path 2 is chosen for the portion of the time period between times $t_1$ and $t_x$; Path 3 is chosen for the portion of the time period between times $t_x$ and $t_y$; and Path 4 is chosen for the portion of the time period between $t_y$ and $t_2$. Therefore, the plurality of paths is ordered in time. That is, a first path of the plurality of paths is determined for the earliest portion of the time period, a second path of the plurality of paths is determined for the next portion of the time period that follows the earliest portion, and so on.

Therefore, at least one path is available at any time for the whole of the time period between $t_1$ and $t_2$. In some embodiments, path switching during the time period, such as at times $t_x$ and $t_y$, may be short, for example below 50 ms, such that provision of the service can be considered to be continuous between $t_1$ and $t_2$. In other embodiments, at least two of the paths may overlap, for example to allow a path to be at least partly established before a preceding path is released, such that there is little or no path switching time. For example, referring to the example in FIG. 3, Path 3 may be chosen for a portion of the time period between a time before $t_x$ and $t_y$, such that a first path utilizing Path 2 and a second path utilizing Path 3 overlap.

Figure 4:
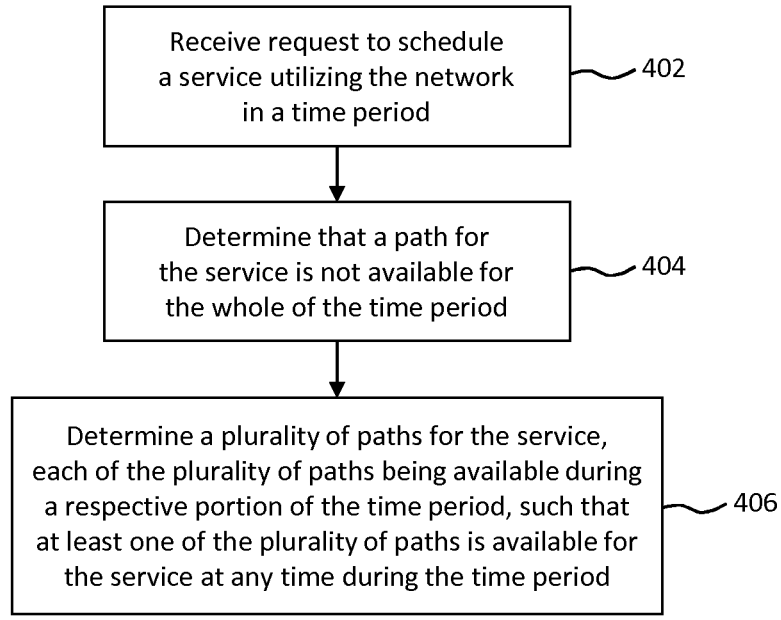
FIG. 4 is a flow chart of a method according to embodiments of the disclosure.

FIG. 4 shows an example of flow chart of a method 400 for path computation in a telecommunications network. The method may be carried out in some embodiments in a PCE in a network node (such as a PNC 106 or MDSC 108), or in other embodiments in another network node or entity.

In step 402 of the method 400, a request is received to schedule a service utilizing the network in a time period. The request may specify the time period, for example the start time and duration of the service, or the start time and end time of the service, or may specify the time period in any other suitable manner. The request may also identify the network nodes (such as PEs) that are to be connected by the service. In some embodiments, for example, the request may be received by a MDSC (such as MDSC 108) from a CNC (such as CNC 110). In some embodiments, the request is a PCEP message. In other embodiments, the request is defined according to YANG and received according to the NETCONF network configuration protocol. In still further embodiments, any suitable data structures and/or communication protocols may be used to define and communicate the request.

In step 404, it is determined that that a path for the service is not available for the whole of the time period specified in the request. For example, all of the possible paths are unavailable for at least part of the time period. Additionally or alternatively, in some embodiments, none of the possible paths meet one or more criteria, such as requirements for latency, throughput, path cost, number of hops and the like. The criteria may be predetermined and/or specified in the request, for example.

In step 406, a plurality of paths is determined for the service, each of the plurality of paths being available during a respective portion of the time period, such that at least one of the plurality of paths is available for the service at any time during the time period. In some embodiments, each of the plurality of paths may meet certain criteria, such as for example in terms of latency, throughput, path cost, number of hops and the like. These criteria may be predetermined and/or specified in the request, for example. In some embodiments, the plurality of paths as a whole may meet one or more criteria, such as for example the maximum number of paths or path changes during the time period. These criteria may be predetermined and/or specified in the request, for example.

The paths may be selected from the existing paths in any suitable manner. For example, in some embodiments, a first sub-frame of the time period is identified by considering the paths available at the start of the time period, and choosing the path that is available for the longest duration. The portion of the time period for which the chosen path is available is the first sub-frame. The next sub-frame may be selected in the same manner starting from the end of the previous sub-frame. This process may be repeated until paths are chosen for the whole of the time period. This is merely an example and any other suitable process for selecting a plurality of paths may be used. For example, in some embodiments, the time period is first split into predefined sub-frames, and a path is chosen that is available for each sub-frame.

Once the plurality of paths has been determined, information relating to the paths may be returned to the sender of the request, such as for example the CNC 110 shown in FIG. 1. The CNC may use this information, or may send the information to another node or entity, to ensure that each path of the plurality of paths is used during their respective portions of the period of time to provide the service. For example, the CNC 110 and/or the other node or entity may send instructions to the appropriate network nodes to implement each of the paths at the appropriate times. In alternative embodiments, these instructions may be sent by other parts of the network, such as for example by the MDSC 108 and/or one or more of the PNCs 106.

In some example embodiments, a path may specify one or more routing or switching elements within one or more domains 104. To establish a path, the MDSC 108 may send instructions to each of the PNCs 106 that include at least one routing or switching element in the associated domain for the path. The instructions may cause the routing or switching elements to route communications along the path such that the communications path between two end points (such as network nodes or PEs) is implemented. An example of a suitable network type for such embodiments is a label switched network that uses label switched paths (LPSs). Instructions to routing or switching elements to implement a path may be sent at the start of the portion of the time period during which the path is to be used, or in advance of the start of the portion of the time period. As a result, configuration of a path may be initiated before the start of the portion of the time period during which the path is to be used, which may in some cases ensure that the path is ready to be used at the start of the portion of the time period. In some embodiments, instructions to establish or implement a path may be sent to other network nodes or entities. For example, instructions may be sent to each PNC 106 that is associated with a domain used by the path. The PNC(s) may then take appropriate actions to ensure that the part of the path that traverses their associated domain is implemented during the portion of the time period when the path is to be used.

In other embodiments, such as for example networks that use source routing (e.g. "segment routing"), the path to be used is specified at least in part by the source node of a communication in a service. In such embodiments, instructions to use a particular path may be sent to one or both end point nodes for a service to use each path at the appropriate times. The nodes may then prepare suitable communications such that the service is implemented through each path during its respective portion of the time period. In some embodiments, at least one of the paths is a Label Switched Path (LSP) or is implemented as a LSP.

In some embodiments, at the start of a portion of a time period during which a path is to be used, the path to be used may be recalculated, i.e. the path to use during the portion of the time period may be chosen again. This may allow a more preferable path to be selected that may not have been available during the portion of the time period when the request to compute a path was received. For example, another service that had reserved at least part of the more preferable path during the portion of the time period may have subsequently indicated that the path was no longer needed. As an example, referring to FIGS. 2 and 3, at time $t_x$ the next path to use may be recalculated. If after the request was received, Path 4 has become available between times $t_x$ and $t_y$, the plurality of paths may be updated such that Path 4 is used between times $t_x$ and $t_2$. As a result, fewer paths are used between these two times, reducing the need to switch paths which may be preferable. The recalculation may be performed at any one or more of the times at which the path being used is due to be switched, and/or at any other times. A different path may be selected at such times due to other considerations, such as for example a lower latency, lower cost and/or higher throughput path having become available, and/or any other considerations.

In some embodiments, once a list of paths for the service in the time period has been determined, each of the paths is reserved for their respective time periods. This may ensure that each of the paths is available during the portions of the time periods when they are to be used. The reserved paths may then be considered as unavailable to other services during their respective portions of the time periods. For example, referring to FIG. 3, a second service that requests a path between two network nodes between, for example, times $t_x$ and $t_y$ will not be able to use any of paths 1-5 for the whole of this time period. In some embodiments, certain paths may become unavailable before they are to be used, due to for example hardware failure or a request to compute a path for a higher priority service. In such cases, the recalculation disclosed above may allow an alternative path to be found in place of the originally determined path that has become unavailable.

Figure 5:
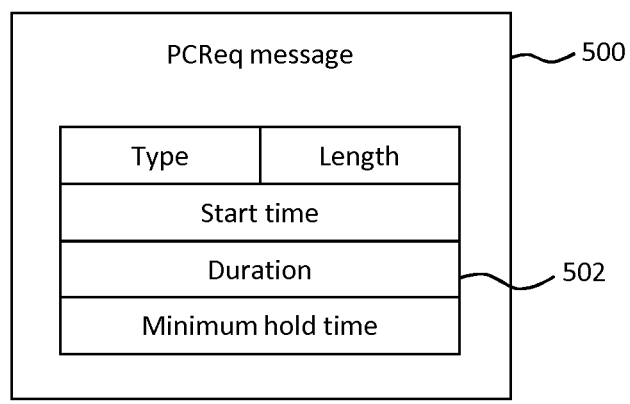
FIG. 5 shows an example of a request to schedule a service.

FIG. 5 shows an example of a request 500 to schedule a service utilizing a telecommunications network during a time period. The request 500 is in the form of a PCEP Path Computation Request (PCReq) message. The message 500 includes a data structure 502 in the form of a Type-Length-Value (TLV) data structure. The TLV data structure 502 includes a type field that specifies a type of the data structure. That is, the type identifies the data structure and the type of data it contains. The data structure 502 also includes a length field that indicates a length of the data structure, for example in bytes, a start time of the service, a duration of the service, and a minimum hold time that specifies the minimum length of time for each of the paths if a plurality of paths is determined. The PCReq message may be sent from a requesting node to a node that computes paths in the network, such as a PCE in MDSC 108 shown in FIG. 1. The PCReq may include information other than the data structure 502. The PCReq message may also specify other criteria or constraints on the requested path. For example, the PCReq message may specify the maximum number of paths or reroutings for the service in the time period.

In some embodiments, the data structure 502 is similar to the SCHED-LSP-ATTRIBUTE TLV within the LSP Object of a PCReq message, as defined in PCEP Extensions for Stateful PCE, draft-ietf-pce-stateful-pce-18. However, the data structure 502 includes an additional field specifying the minimum hold time.

Figure 6:
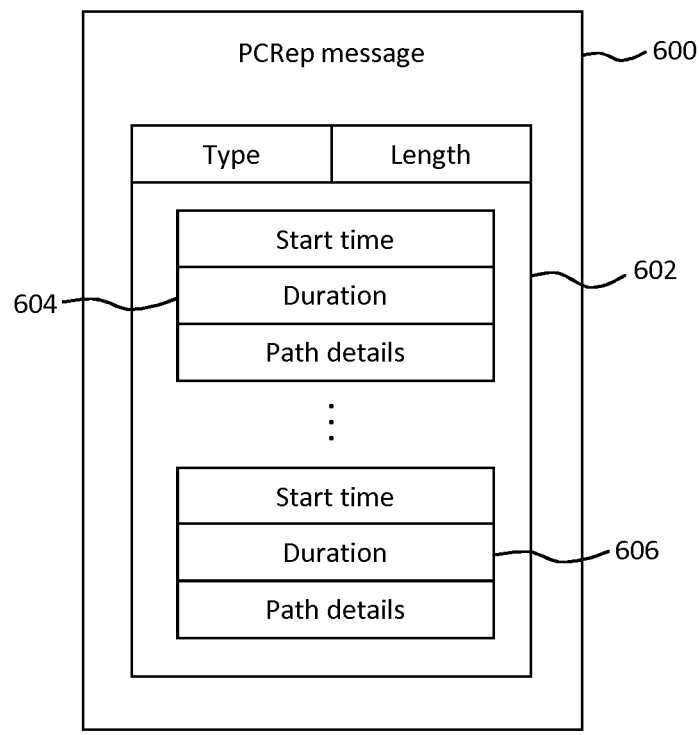
FIG. 6 shows an example of a reply to a request to schedule a service.

FIG. 6 shows an example of a reply 600 to a request to schedule a service utilizing a telecommunications network during a time period. The request 500 is in the form of a PCEP Path Computation Reply (PCRep) message. The reply may be sent from a path computing node, such as a PCE in MDSC 108 shown in FIG. 1, to a requesting node, such as CNC 110 in FIG. 1.

The PCRep message 600 includes a TLV data structure 602 that includes a type field that identifies the data structure and indicates the type of data it contains. The data structure 602 also includes a length field that indicates the length of the data structure. The data structure 602 includes one or more data blocks. In the example shown, a first data block 604 and a last data block are shown, though in other examples the data structure 602 may contain any number of data blocks. Each data block 604, 606 corresponds to one of the plurality of paths that have been determined in a path computation, and specifies the start time of the path, a duration of the path, and path details. In some embodiments, the path details is an Explicit Route Object (ERO) as defined in RFC3209, RFC3474 and RFC3477. In other examples, any information may be included in the PCRep message 600 that will allow appropriate network elements to implement or cause to be implemented each path at the appropriate time and for the appropriate duration.

In the example shown in FIG. 3, the CNC 110 may send a PCReq message to a PCE within MDSC 108 requesting a service to be scheduled between PA 112a and PE 112c between times $t_1$ and $t_2$. The PCE may return a PCRep message specifying the details of the paths determined. More specifically, the data structure 602 within the PCRep message may include three data blocks detailing each of the paths. A first data block may specify a start time $t_1$, a duration ($t_x-t_1$), and an ERO specifying the first path (identified as Path 2 in FIG. 3). A second data block may specify a start time $t_x$, a duration ($t_y-t_x$), and an ERO specifying the second path (identified as Path 3 in FIG. 3). A third data block may specify a start time $t_y$, a duration ($t_2-t_y$), and an ERO specifying the third path (identified as Path 4 in FIG. 3).

Although the example request 500 shown in FIG. 5 is a PCReq message and the reply 600 shown in FIG. 6 is a PCRep message, the present disclosure is not limited to these messages or PCEP, other message types, data structures and/or communication protocols may instead be used to convey similar information.

Figure 7:
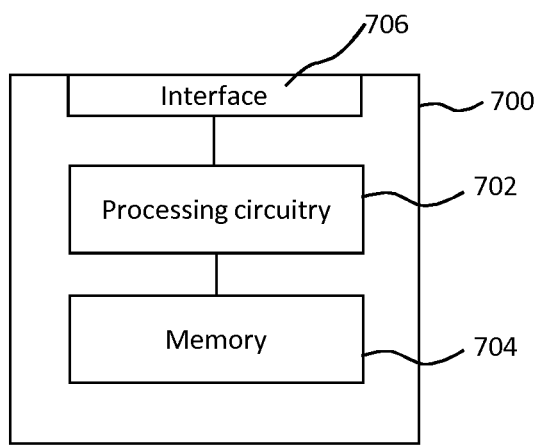
FIG. 7 is a schematic diagram of a network node according to embodiments of the disclosure.

FIG. 7 shows an example of a network node 700 according to embodiments of the disclosure. The network node 600 may be for example a PCE, a PNC or a MDSC, and may be physical or virtual. The network node 700 may be configured to perform the method of FIG. 4.

The network node 700 comprises a processor 702 and a memory 704. The memory 704 contains instructions executable by the processor 702.

In one embodiment, the apparatus 700 is operable to: receive a request to schedule the service utilizing the network in a time period; determine that a path for the service is not available for the whole of the time period; and determine a plurality of paths for the service, each of the plurality of paths being available during a respective portion of the time period, such that at least one of the plurality of paths is available for the service at any time during the time period. The apparatus, 700, also comprises an interface, 706, for connecting to the network and via said network to other elements of the network. Although FIG. 7 illustrates one embodiment in which the components of the apparatus 700 are connected in series it would be clear for a person skilled in the art that alternative embodiments are also possible, e.g. connection to a bus.

Figure 8:
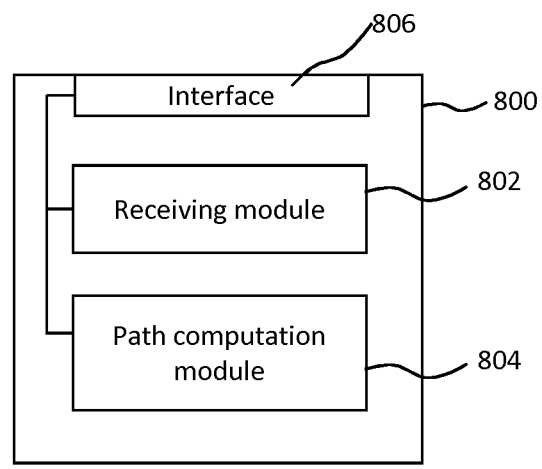
FIG. 8 is a schematic diagram of a network node according to further embodiments of the disclosure.

FIG. 8 is a schematic drawing of a network node 800 according to further embodiments of the disclosure. For example, the network node 800 may be a PCE, a PNC or a MDSC, and may be physical or virtual. The network node 800 may be configured to perform the method of FIG. 4.

In one embodiment, the receiving module 802 is configured to receive a request to schedule the service utilizing the network in a time period. The path computation module 804 is configured to determine that a path for the service is not available for the whole of the time period, and determine a plurality of paths for the service, each of the plurality of paths being available during a respective portion of the time period, such that at least one of the plurality of paths is available for the service at any time during the time period. The apparatus, 800, also comprises an interface, 806, for connecting to the network and via said network to other elements of the network. Although FIG. 8 illustrates one embodiment in which the components of the apparatus 800 are connected to a bus it would be clear for a person skilled in the art that alternative embodiments are also possible, e.g. connection in series.

Advantages provided by embodiments of the disclosure include the ability to determine paths through a network for a service to ensure that a service is continuously established or connected for the entirety of a requested period, even if no single path is available for that period. Advantages may also include increased efficiency by enabling utilization of network resources that would otherwise have gone unused.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfill the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method for path computation for a service in a telecommunications network, the method comprising:
   receiving a request to schedule the service utilizing the network in a time period;
   determining that no path for the service has a period of availability that extends for the whole of the time period;
   determining a plurality of paths for the service, each of the plurality of paths being available during a respective portion of the time period, such that at least one of the plurality of paths is available for the service at any time during the time period, and wherein each respective portion of the time period is shorter than the whole of the time period; and
   reserving each of the plurality of paths for its respective portion of the time period to schedule the requested service.

2. The method of claim 1, further comprising recalculating at least one of the plurality of paths before or at the start of its respective portion of the time period.

3. The method of claim 1, wherein the request comprises a Path Computation Element Communication Protocol (PCEP) Path Computation Request (PCReq) message.

4. The method of claim 1, wherein the request specifies a maximum number of paths for the service through the network during the time period.

5. The method of claim 1, further comprising sending details of the plurality of paths to a sender of the request.

6. The method of claim 5, wherein sending details of the plurality of paths to the sender of the request comprises sending a Path Computation Element Communication Protocol (PCEP) Path Computation Reply (PCRep) message.

7. The method of claim 5, wherein sending details of the plurality of paths to the sender of the request comprises sending, for each path, a start time of its respective portion of the time period, a duration of its respective portion of the time period, and a route for the path.

8. The method of claim 1, further comprising dividing the time period into sub-frames, and wherein, for each path, its respective portion of the time period comprises at least one of the sub-frames.

9. The method of claim 1, wherein determining the plurality of paths comprises, for each path, determining one or more network domains utilized by the path and sending, for each network domain, an instruction to a Physical Network Controller (PNC) associated with the network domain to determine a portion of the path that utilizes the network domain.

10. The method of claim 1, wherein determining the plurality of paths comprises scheduling, for each path, the path for the service through the network during its respective portion of the time period.

11. The method of claim 1, further comprising sending one or more instructions to a source node of the service to utilize the plurality of paths for the respective portions of the time period.

12. A non-transitory computer readable medium having stored thereon a computer program comprising instructions that, when executed on at least one processor, cause the at least one processor to carry out a method for path computation for a service in a telecommunications network, the method comprising:
- receiving a request to schedule the service utilizing the network in a time period;
- determining that no path for the service has a period of availability that extends for the whole of the time period;
- determining a plurality of paths for the service, each of the plurality of paths being available during a respective portion of the time period, such that at least one of the plurality of paths is available for the service at any time during the time period, and wherein each respective portion of the time period is shorter than the whole of the time period; and
- reserving each of the plurality of paths for its respective portion of the time period to schedule the requested service.

13. An apparatus for path computation for a service in a telecommunications network, the apparatus comprising:
- a processor; and
- a memory, the memory containing instructions executable by the processor such that the apparatus is operable to:
- receive a request to schedule the service utilizing the network in a time period;
- determine that no path for the service has a period of availability that extends for the whole of the time period;
- determine a plurality of paths for the service, each of the plurality of paths being available during a respective portion of the time period, such that at least one of the plurality of paths is available for the service at any time during the time period, and wherein each respective portion of the time period is shorter than the whole of the time period; and
- reserve each of the plurality of paths for its respective portion of the time period to schedule the requested service.

14. The apparatus of claim 13, wherein the memory contains instructions executable by the processor such that the apparatus is operable to send details of the plurality of paths to a sender of the request.

15. The apparatus of claim 13, wherein the memory contains instructions executable by the processor such that the apparatus is operable to determine the plurality of paths by determining, for each path, one or more network domains utilized by the path and sending, for each network domain, an instruction to a Physical Network Controller (PNC) associated with the network domain to determine a portion of the path that utilizes the network domain.

16. The apparatus of claim 13, wherein the memory contains instructions executable by the processor such that the apparatus is operable to send one or more instructions to a source node of the service to utilize the plurality of paths for the respective portions of the time period.

17. The apparatus of claim 13, wherein the plurality of paths are ordered in time, and the memory contains instructions executable by the processor such that the apparatus is operable to initiate, for each of a second and subsequent paths of the plurality of paths, configuration of the path such that at least part of the path is available before or at the end of a portion of time during which the preceding path is available.

18. The apparatus of claim 13, wherein the memory contains instructions executable by the processor such that the apparatus is operable to establish connectivity for the service during the time period using the plurality of paths.

* * * * *